Figures 6, 7, 8, 13:
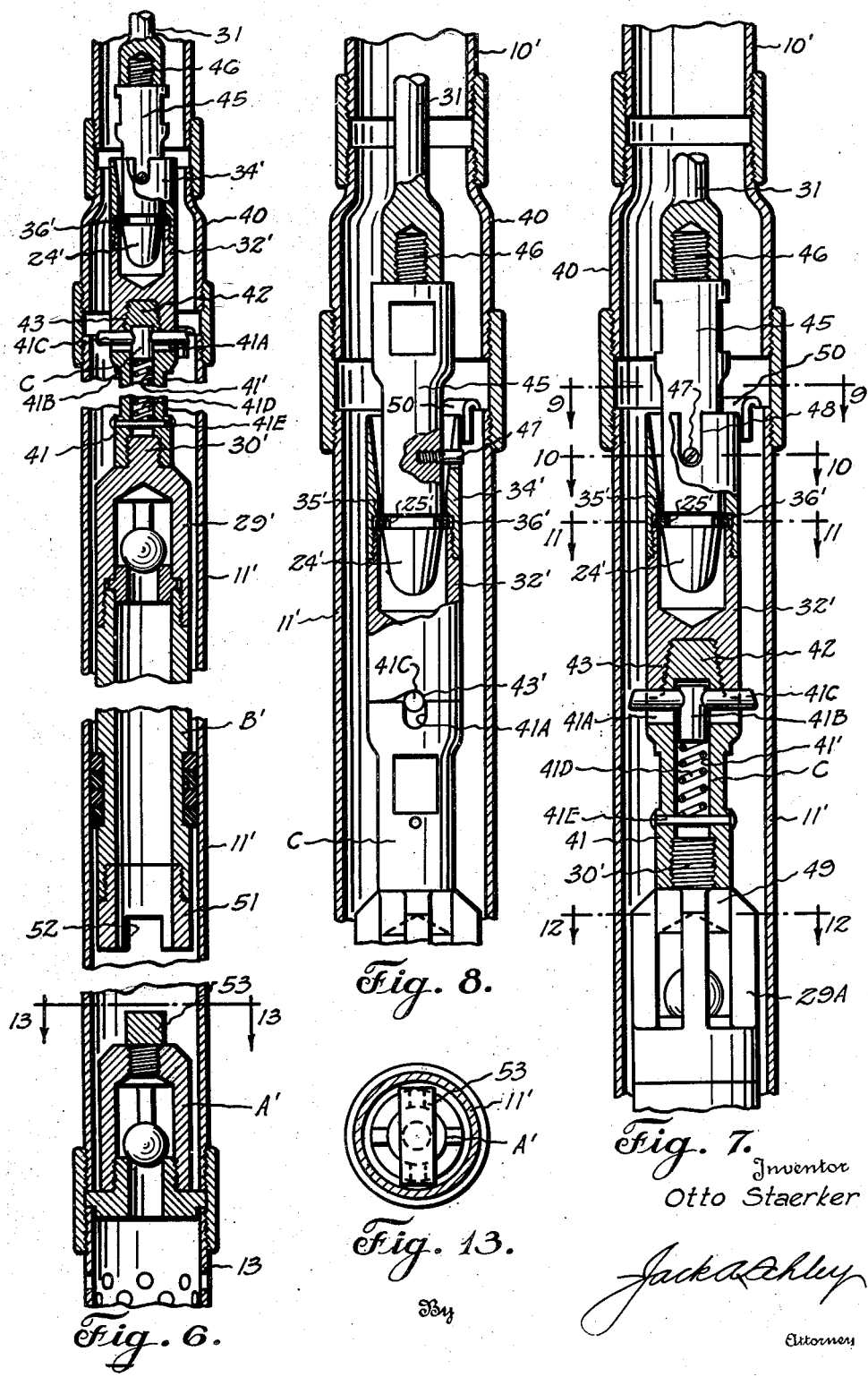

Dec. 16, 1941.  O. STAERKER  2,266,344
COUPLING
Filed March 11, 1938     3 Sheets-Sheet 1
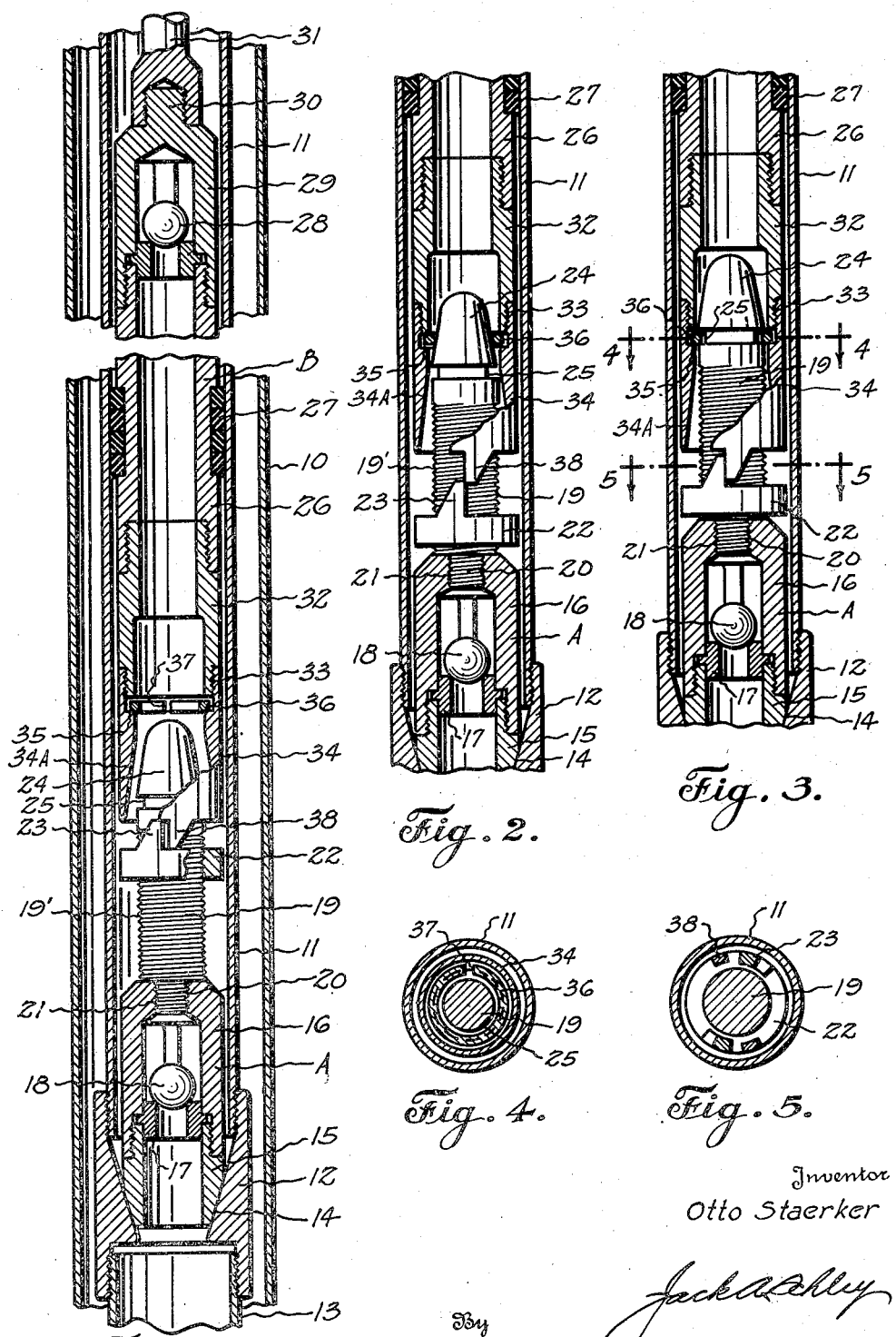
Inventor
Otto Staerker
By Jack A. Ashley
Attorney Dec. 16, 1941.  O. STAERKER  2,266,344
COUPLING
Filed March 11, 1938   3 Sheets-Sheet 2

Inventor
Otto Staerker
By Jack A. Ashley
Attorney

Dec. 16, 1941.    O. STAERKER    2,266,344
COUPLING
Filed March 11, 1938    3 Sheets-Sheet 3

Inventor
Otto Staerker

By Jack A. Ashley
Attorney

Patented Dec. 16, 1941

2,266,344

UNITED STATES PATENT OFFICE 2,266,344

COUPLING

Otto Staerker, Gladewater, Tex.

Application March 11, 1938, Serial No. 195,207

4 Claims. (Cl. 103—226)

This invention relates to new and useful improvements in couplings.

One object of the invention is to provide an improved coupling which is particularly adapted for use in connecting well pumping rods with a valve, pump plunger or other member, and which is so constructed that the connection may be made within the tubing after the latter has been set within the well bore, whereby said valve, or other element, which has been coupled to the rods may be removed from the tubing without "pulling" the latter from the bore.

Another object of the invention is to provide an improved coupling which includes a pair of coacting members, one of which is insertable within the other, the members being entirely free of screw threads and being arranged to couple or connect when the insertable member has moved within the other member a predetermined distance, whereby coupling is simplified and may be accomplished without rotation; the coupling being such that after the connection is made, the members may swivel, or rotate axially, with relation to each other.

An important object of the invention is to provide an improved coupling means including coacting coupling elements, one of which is adapted to be secured to a removable standing valve located within a well tubing, while the other element is carried by the pump plunger, whereby when the elements are coupled the valve may be removed from the tubing with the plunger and without pulling the tubing from the well bore.

Another object of the invention is to provide an improved coupling for connecting a pump plunger and standing valve to permit removal of said valve, there also being means for preventing coupling of the members during normal pumping operation, whereby the plunger may freely reciprocate within the tubing without danger of accidental or unintentional coupling of said members.

A particular object of the invention is to provide an improved coupling for connecting well pumping rods with a pump plunger, whereby the plunger may be placed within the working barrel and lowered into the well bore with the well tubing, after which the pumping rods may be run into the well, such arrangement making it possible to run the tubing and rods separately and also eliminating the necessity of lowering the plunger through the tubing, which permits a larger working barrel to be used; there also being means for readily disconnecting the rods from the plunger whereby said rods may be removed from the well separately of the tubing.

A construction designed to carry out the invention will be hereinafter described, together with other features of the invention.

Figure 14:
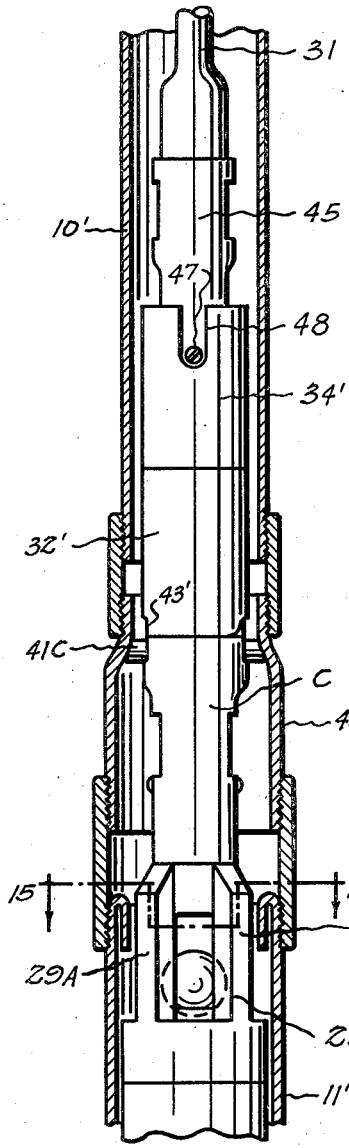
Figure 9:
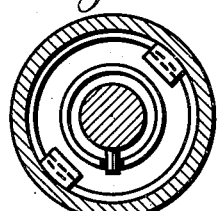
Figure 16:
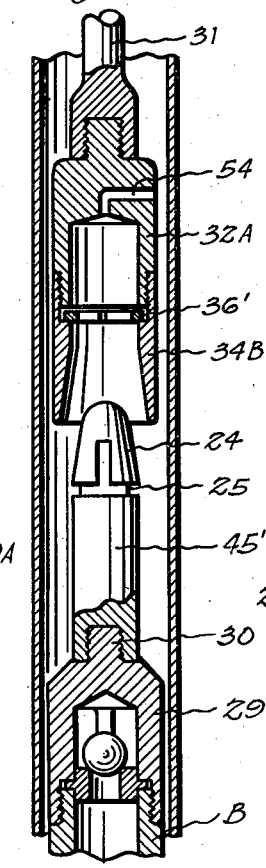
Figure 11:
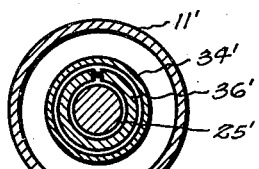
Figure 10:
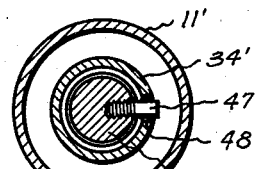
Figure 12:
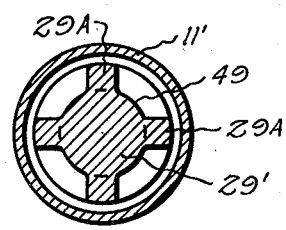
Figure 15:
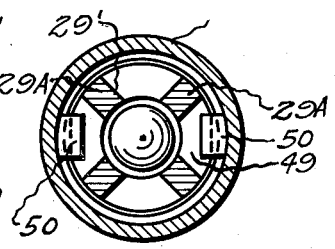

The invention will be more readily understood from a reading of the following specification and by reference to the accompanying drawings, in which an example of the invention is shown, and wherein:

Figure 1 is a view partly in elevation and partly in section showing a coupling member, constructed in accordance with the invention as applied to a pump plunger and standing valve, Figure 2 is a transverse, vertical, sectional view of the coupling member showing the two elements of said member moved toward each other, Figure 3 is a view similar to Figure 2 with the elements in their coupled position, Figure 4 is a horizontal, cross-sectional view taken on the line 4—4 of Figure 3, Figure 5 is a horizontal, cross-sectional view taken on the line 5—5 of Figure 3, Figure 6 is a transverse, vertical, sectional view showing the coupling member as connecting a pump plunger and pump rods, Figure 7 is an enlarged view partly in elevation and partly in section showing in detail the connection between the pump rods and the plunger, Figure 8 is a view partly in section and partly in elevation of the coupling and taken at right angles to the parts as shown in Figure 7, Figure 9 is a horizontal, cross-sectional view taken on the line 9—9 of Figure 7, Figure 10 is a horizontal, cross-sectional view taken on the line 10—10 of Figure 7, Figure 11 is a horizontal, cross-sectional view taken on the line 11—11 of Figure 7, Figure 12 is a horizontal, cross-sectional view taken on the line 12—12 of Figure 7, Figure 13 is a horizontal, cross-sectional view taken on the line 13—13 of Figure 6, Figure 14 is a view partly in elevation and partly in section and showing the coupling and plunger in a position for disconnection, Figure 15 is a horizontal, cross-sectional view taken on the line 15—15 of Figure 14, and Figure 16 is a transverse, vertical, sectional view of a modified form of coupling for connecting the pump plunger with the pump rods.

In the drawings, the numeral 10 designates a well casing of the usual construction, which has the ordinary well tubing (not shown) extending axially therethrough. A working barrel 11 depends from the tubing and a seating collar 12 is threaded onto the lower end of the working barrel, while the usual well screen 13 is connected to the lower end of said collar. An internal, annular, beveled seat 14 is formed within the collar 12 and a standing valve A is adapted to rest on this seat.

The valve A comprises a seating member or head 15 which has its outer surface inclined, complementary to the inclination of the seat 14, whereby said head engages said seat. A cage 16 is threaded onto the upper end of the member 15 and a valve seat 17 is confined between the cage and member. A ball 18 is arranged to engage the seat 17 and moves within the cage 16. The operation of the standing valve A is obvious, said valve acting to permit an upward flow through the tubing and preventing a downward flow therethrough. In carrying out the invention, an elongate mandrel 19 is formed with an axial, threaded pin 20 at its lower end and this pin is arranged to be screwed into an opening 21 provided in the top of the valve cage 16. The mandrel 19 is provided with external screw threads 19' which extend substantially throughout the length of said mandrel. A collar 22 is threaded on the mandrel 19 and when rotated will travel vertically on said mandrel. The collar is formed with upwardly extending lugs 23 which are located diametrically opposite each other and the purpose of these lugs will be hereinafter explained.

The upper end of the mandrel is formed with a tapered or conical head 24 which has its top rounded, as is clearly shown in Figures 1 to 3. The head is preferably made integral with the mandrel and an external, annular groove or recess 25 is formed at the base of the head. With the above arrangement, it will be seen that the standing valve A is supported on the seat 14, and the mandrel 19 and head 24 are carried by the cage 16 of the standing valve. The head and mandrel extend upwardly from the standing valve and are, of course, located within the working barrel 11.

A pump plunger B is movable vertically within the working barrel 11 and includes a tubular mandrel 26 having the usual packing elements 27 thereon. A traveling valve 28 of the usual construction is located within a cage 29 secured to the upper end of the mandrel. An axial threaded pin 30 extends upwardly from the cage 29 and the usual pump rods 31 are connected to the pin 30, whereby the plunger is supported by said rods. When the rods are reciprocated, the plunger 26 is reciprocated in the working barrel 11 to pump the well in the usual manner.

A coupling sleeve 32 is threaded into the lower end of the tubular mandrel 26 and depends therefrom. The lower end of the sleeve is reduced and externally threaded, as shown at 33 and a collar 34 is threaded thereon. An internal, annular shoulder 35 is formed within the upper end of the collar and a snap ring 36 rests on this shoulder, being confined between said shoulder and the lower end of the sleeve 32. The ring 36 is split as shown at 37 and is constructed of spring metal, whereby its inherent resiliency holds the ring inwardly of the bore of the collar 34 (Figure 1). The lower end of the bore of the collar 34 is tapered or flared outwardly as shown at 34a, while the lower edge of the collar is provided with depending lugs 38, which lugs are located diametrically opposite each other and are arranged to coact with the lugs 23 on the stop collar 22, as will be explained.

In operation, the standing valve A, having the mandrel 19 and head 24 extending upwardly therefrom, is seated within the collar 12 on the lower end of the working barrel 11. The barrel is, of course, secured to the lower end of the tubing and is run into the casing with said tubing. After the tubing has been set, the rods 31, having the pump plunger B fastened to their lower ends, are run into the well. At this time, the stop collar 22 on the mandrel 19 is at the upper end of said mandrel, as shown in Figure 1. The pump plunger is lowered into the working barrel to a point where the lower end of the collar 34, carried thereby, is spaced above the collar 22.

After the plunger is in position within the working barrel, the pumping of the well may be carried out with the plunger B reciprocating within said barrel. It is noted that during the normal pumping operation of the well, the lower end of the collar 34 on the plunger B never strikes the collar 22 as the bottom of the pump stroke terminates above said collar. Thus, it will be seen that the pump may normally lift the fluid in the usual manner without interference from the coupling which is not connecting the parts at such time.

When it is desired to remove the standing valve A, for any reason whatever, it is only necessary to lower the plunger B until the lugs 38 on the collar 34 strike the upper surface of the collar 22 on the mandrel 19. At such time, the head 24 has entered the tapered bore 34a of the collar 34, as shown in Figure 1. After the lugs 38 have engaged the collar 22, the rods 31 and pump plunger B are rotated in a clockwise direction in Figure 5, whereby the flat side of the lugs 38 will strike the flat side of the lugs 23. Continued rotation of the plunger B after the engagement of the lugs 38 and 23 will impart a rotation to the collar 22 and such rotation will screw the collar 22 downwardly on the mandrel 19, as shown in Figure 2. The plunger is rotated until the collar 22 is screwed downwardly to the point where the lugs disengage each other, in which position, the conical head 24 has moved into the ring 36. After this position is reached, the plunger B may be lowered the distance between the lower ends of the lugs 38 and the upper surface of the collar 22. The height of the lugs 23 is sufficient so that this downward movement will aline the ring 36 with the groove 25 formed at the base of the head 24.

Thus, after the stop collar 22 has been screwed downwardly on the mandrel 19 a sufficient distance to permit a downward movement of the plunger B, said plunger is lowered to the position shown in Figure 3. This causes the head to move into the sleeve 32 and upon such movement, to expand the ring 36. As the groove 25 moves into alinement with the ring 36, said ring, due to its inherent tension and resiliency, snaps into said groove and thereby connects the mandrel and head with the collar 34 and sleeve 32. The members are thus coupled together and upon removing the plunger B from the working barrel and well tubing, the standing valve A is also removed therefrom. When the parts have been taken to the surface, the collar 34 is unscrewed from the sleeve 32, which permits the spring ring 36 to be disengaged from the groove 25, whereby the parts are uncoupled. Before the standing valve is returned into the well, the stop collar 22 is rotated to position it at the upper end of the mandrel 19.

It will thus be seen that an effective and quick coupling of the pump plunger with the standing valve may be made below the surface. There are no threads which must be alined to bring about the coupling and due to the tapered bore 34a of the collar 34, the head 24 is positively guided into said collar. The stop collar 22 prevents an accidental coupling or connection to be made during the normal operation of the pump plunger B, for obviously as the stroke of the pump plunger is unintentionally lengthened, the lower ends of the lugs 38 will merely strike the collar 22 and thereby prevent the plunger from moving downwardly a sufficient distance to couple the head with the collar 34 and sleeve 32.

In Figures 1 to 5, the pump plunger B is shown as working within a working barrel 11, which has approximately the same diameter as the well tubing (not shown). In many instances, it is desirable that the working barrel be larger than the tubing, whereby more fluid may be pumped or lifted to the surface, due to the fact that a larger plunger may be employed. In Figures 6 to 15, the improved coupling, with slight modifications, is shown as connecting a pump plunger with its pump rods. In this form of the invention, a working barrel 11' which has a larger diameter than the well tubing 10' is connected to said well tubing by a suitable swaged nipple or coupling 40. A standing valve A', similar in construction to the standing valve A, is permanently mounted at the lower end of the working barrel 11'. As is clearly shown in Figure 6, the standing valve A' is not removable, being clamped between the lower end of the working barrel 11' and the upper end of the well screen 13. An enlarged pump plunger B' of substantially the same construction as the plunger B is movable vertically within the enlarged working barrel 11'. Since the working barrel and plunger have a larger diameter than the tubing 10', it will be manifest that said plunger cannot be lifted through or run into the tubing and therefore, it is necessary that the plunger B' be disposed or located within the working barrel, before said working barrel is lowered into the well bore.

Connected to the upper end of the plunger B' is a tool joint C which includes a lower member 41. This lower member has a socket at its lower end which receives the pin 30' at the upper end of the cage 29' on the plunger B'. An upwardly extending pin 42 is formed at the upper end of the member 41 and this pin is provided with external, lefthand screw threads. The pin is adapted to engage within a socket 43 formed on the lower end of a sleeve member 32'. This sleeve member has its upper end connected with a collar 34', which is similar to the collar 34 in the first form. A snap ring 36', similar to the ring 36, is confined between the upper end of the sleeve member 32' and a shoulder 35' which is formed within the collar 34'. The upper end of the bore of the collar 34' is tapered outwardly in a manner similar to the inclination of the bore of the collar 34. From the foregoing, it will be seen that the tool joint C connects the sleeve member 32' of the coupling element with the upper end of the plunger B'. The lefthand threads of the socket 43 permit the sleeve member 32' to be disconnected from the member 41 without disconnecting said member from the plunger B' or without disconnecting any of the other thread connections in the string, as such thread connections employ standard righthand threads.

For preventing the accidental unscrewing of the pin 42 from the socket 43, the member 41 is formed with an axial bore 41' which has radial recesses or slots 41a at its upper end. A plunger 41b is slidable in the bore and radial pins 41c extend from the plunger and project through the recesses or slots 41a, said pins being movable vertically in said slots. A coiled spring 41d is located within the bore 41' and is confined between the lower end of the plunger and a transverse pin 41e which extends across the lower end of the bore. The spring exerts its pressure to constantly urge the plunger 41a and pins 41c upwardly.

When the sleeve member 32' is screwed onto the pin 42 of the member 41, the radial pins 41c are adapted to engage in recesses 43' which are provided in the lower edge portion of the sleeve member (Figures 7 and 8). When the pins are so engaged, rotation of the sleeve 32' with relation to the member 41 is prevented and accidental or unintentional unscrewing of the parts is prevented. The pins 41c and recesses 43' thus provide a lock for holding the connected parts of the tool joint C together.

The plunger B' carrying the coupling element formed by sleeve member 32' and the collar 34' is assembled within the working barrel 11' before said working barrel is fastened to the lower end of the tubing 10' and prior to the running of said tubing and working barrel into the well. The working barrel and tubing are then lowered into the well bore and are suitably set therein. At this time, the pump rods 31 are not run into the well but are lowered through the tubing after the working barrel has been properly set, as will be presently explained. After the tubing 10' and working barrel 11' are properly located within the well bore, the pump rods 31 are then lowered through the tubing. A mandrel 45 is provided with a pin 46 at its upper end and this pin is threaded into the socket formed on the lower end of the lowermost pump rod 31, whereby said mandrel is connected to said rod. The lower end of the mandrel is formed with a head 24' which is similar to the head 24, described in the first form. An external, annular groove 25' is provided between the conical head 24' and the mandrel 45. A radial pin 47 extends outwardly from the mandrel 45 and said pin is spaced above the groove 25'. The pin is adapted to engage in a recess 48 formed in the upper edge portion of the collar 34'.

In operation, the plunger B' is assembled within the working barrel 11' at the surface, after which the working barrel is connected to the tubing 10' and is lowered into the well bore. After the tubing and working barrel are properly set, the rods 31 having the mandrel 45 secured to their lower ends, are run through the tubing. The rods are lowered until the head 24' on the lower end of the mandrel 45 enters the upper end of the collar 34'. This lowering continues until the radial pin 47 strikes the upper edge of the collar 34' after which downward movement of the rods and mandrel is halted. When this position is reached, the rods 31 are rotated until the pin 47 registers with the recess 48 in the collar 34'. When this occurs, a continued downward movement of the rods and mandrel 45 may occur and such downward movement causes the groove 25' between the head 24' and mandrel 45 to aline with the snap ring 36', whereby said ring may engage within the groove to couple the mandrel and the collar 34' together. After the coupling is completed in this manner, it is evident that the rods 31 may be reciprocated and the plunger B will thereby be moved vertically within the working barrel 11' to lift the well fluid to the surface through its pumping action. The coupling is positive in its action and may be effected quickly, thereby making it possible to run the tubing and the rods separately into the well.

When it becomes desirable to remove the rods 31 from the well tubing, it is necessary to disconnect said rods from the plunger B', as manifestly, the plunger cannot be pulled upwardly through the tubing 10' which has a smaller diameter than said plunger. To effect the disconnection of the rods and the plunger B', said rods are moved upwardly until the radial pins 41c enter and strike the reduced portion of the swaged coupling 40, as is clearly shown in Figure 14. When this occurs, the pins are forced downwardly in their slots 41a, under tension of the coiled spring 41d, so as to move downwardly out of the recesses 43' of the sleeve 32'. Such disengagement of the pins from the recesses permits rotation of the sleeve 32' with relation to the member 41. At the same time that the pins 41c are moved downwardly due to their engagement with the swaged coupling 40, the vertical grooves 49 formed in the upper end of the valve cage 29' between the vertical ribs 29a of said valve cage, receive depending lugs 50 which are formed on the upper end of the barrel 11'. These lugs extend inwardly and downwardly into the bore of the barrel and when engaged within the grooves 49 of the valve cage, they prevent rotation of said cage. When the lugs 50 are engaged within the grooves 49 and rotation of the cage, as well as the pump plunger B' secured thereto, cannot be had, the pump rods 31 are rotated in a clockwise direction in Figure 15. Such clockwise rotation will tend to tighten all of the righthand threads in the entire string. However, the connection between the socket 43 in the lower end of the sleeve member 32' and the pin 42 on the member 41 is a lefthand thread, and a clockwise rotation of the rods 31 will unscrew the pin 42 from the socket 43, this unscrewing of these parts being permitted since the radial pins 41c have been disengaged from the recesses 43' of the sleeve 32'. After said pin 42 is entirely unscrewed from the socket, the rods 31 may be lifted through the tubing 10' and the plunger B' will remain within the working barrel 11'.

It is pointed out that in some instances the radial pins 41c and their associate parts may be eliminated and an ordinary tool joint having lefthand threads used in place thereof. In such case, the lugs 50 would still be utilized for preventing rotation of the plunger B and lower member of the tool joint which is secured to said plunger. When an ordinary tool joint is substituted for the tool joint C, the lugs 50 might be broken or for some reason it might be impossible to engage said lugs within the grooves 49 of the cage 29'. To take care of such an occurrence, the lower end of the plunger B' may be formed with a collar 51. This collar is provided with recesses 52 which are located diametrically opposite each other. The upper end of the valve cage of the standing valve A' may be provided with a diametrically extending lug 53 which extends upwardly from said cage. If it is impossible to raise the plunger B' so that the recesses 49 in the cage 29' may receive the lugs 50, then the plunger B' may be lowered so that the recesses 52 may engage the lug 53. When so engaged, rotation of the plunger B' is prevented and it is possible to disconnect the rods 31 by unscrewing the lefthand thread connection between the pin 42 and the socket 43.

In Figure 16, still another form of the invention is shown. In this form, a mandrel 45' is connected to the pin 30 on the valve cage 29 of a plunger B and extends upwardly therefrom. The mandrel has the conical head 24 and groove 25 at its upper end. A coupling element similar to the coupling shown in Figure 6 and including a sleeve member 32a and collar 34b is connected to the lower end of the pump rods 31. The spring ring 36' is, of course, secured between the sleeve member 32a and the collar 34b.

In this form, the plunger B may be lowered into the well bore with the tubing string and after it is properly positioned, the rods 31 may be run through the tubing. As the rods are lowered, the collar 34b moves downwardly over the head 24 until the ring 36' engages within the groove 25. When so engaged, the members are coupled together and the plunger B may be reciprocated by means of the rods 31. Since the upper end of the member 32a is followed in this form, an accumulation of paraffin or other material may occur within the bore of the member 32a. In order to permit this accumulation to be removed from the bore when the head 24 moves thereinto, a release passage 54 extends from the bore of the sleeve member 32a to the outer surface thereof.

It is noted that in all forms, the ring 36 and ring 36' has been shown as split at one point, whereby the rings are in a single piece. However, it is pointed out that said ring could be made in two pieces and the same results obtained. In the form shown in Figure 16, no tool joint C has been indicated, but obviously a tool joint could be interposed between the mandrel 45' and the valve cage 29. If such tool joint were employed, a radial pin 47 engageable within recesses provided in the collar 34' would be used so that a rotation could be imparted to the mandrel 45' in order to unscrew such inserted tool joint.

In all forms, shown herein, the connection between rods and plunger may be quickly and easily made and after the parts are coupled, a swiveling or axial rotation of the plunger with relation to the rods may be had, whereby an even wear on said plunger occurs in reciprocation. This prevents scoring of the plunger and barrel and also obviates flattening one side of the plunger with resultant longer wear and increased efficiency.

What I claim and desire to secure by Letters Patent is:

1. The combination with a well pump having a pump plunger and also having pump rods for reciprocating the same, of a coupling including, a tool joint secured to the upper end of the plunger and having a socket and pin each having lefthand threads, an insertable element attached to the lower end of the pump rods and adapted to be inserted in the tool joint, and coacting means on the element and tool joint for coupling the rods and plunger together, the lefthand threaded connection of the tool joint permitting the rods and plunger to be separated after the element has been coupled to the tool joint.

2. The combination with a well pump having a pump plunger and also having pump rods for reciprocating the same, of a coupling including, a tool joint secured to the upper end of the plunger and having a socket and pin each formed with left hand screw threads, a receiving element having its upper end open carried by the tool joint, an insertable element attached to the lower end of the pump rods and adapted to be inserted in the receiving element, one of the elements having an annular groove therein, and means carried by the other element and engageable within said groove for connecting the elements together, the left-hand threaded connection of the tool joint permitting the rods and plunger to be separated after the elements have been coupled.

3. The combination with a well pump having a pump plunger and also having pump rods for reciprocating the same, of a coupling including, a tool joint secured to the upper end of the plunger and having a socket and pin each having left-hand threads, an insertable element attached to the lower end of the pump rods and adapted to be inserted in the tool joint, coacting means on the element and tool joint for coupling the rods and plunger together, the left-hand threaded connection of the tool joint permitting the rods and plunger to be separated after the element has been coupled to the tool joint, and means carried by the tool joint for preventing accidental unscrewing of the left-hand thread connection thereof.

4. The combination with a well pump having a pump plunger and also having pump rods for reciprocating the same, of a coupling including, a tool joint secured to the upper end of the plunger and having a socket and pin each formed with left-hand screw threads, a receiving element having its upper end open carried by the tool joint, an insertable element attached to the lower end of the pump rods and adapted to be inserted in the receiving element, one of the elements having an annular groove therein, means carried by the other element and engageable within said groove for connecting the elements together, the left-hand threaded connection of the tool joint permitting the rods and plunger to be separated after the elements have been coupled, and means mounted in the tool joint for preventing accidental unscrewing of the pin and socket of said joint.

OTTO STAERKER.